Oct. 16, 1951 R. L. CARBREY 2,571,680

PULSE CODE MODULATION SYSTEM EMPLOYING CODE SUBSTITUTION

Filed Feb. 11, 1949 3 Sheets-Sheet 1

INVENTOR
R. L. CARBREY
BY George C. Fook [signature]
ATTORNEY

PULSE CODE MODULATION SYSTEM EMPLOYING CODE SUBSTITUTION

Filed Feb. 11, 1949 3 Sheets-Sheet 2

INVENTOR
R. L. CARBREY
BY George C. Tork
ATTORNEY

PULSE CODE MODULATION SYSTEM EMPLOYING CODE SUBSTITUTION

Filed Feb. 11, 1949

INVENTOR
R. L. CARBREY
BY George Lord
ATTORNEY

Patented Oct. 16, 1951

2,571,680

UNITED STATES PATENT OFFICE 2,571,680

PULSE CODE MODULATION SYSTEM EMPLOYING CODE SUBSTITUTION

Robert L. Carbrey, Summit, N. J., assignor to Bell Telephone Laboratories, Incorporated, New York, N. Y., a corporation of New York Application February 11, 1949, Serial No. 75,875

4 Claims. (Cl. 178—43.5)

Figure 1A:
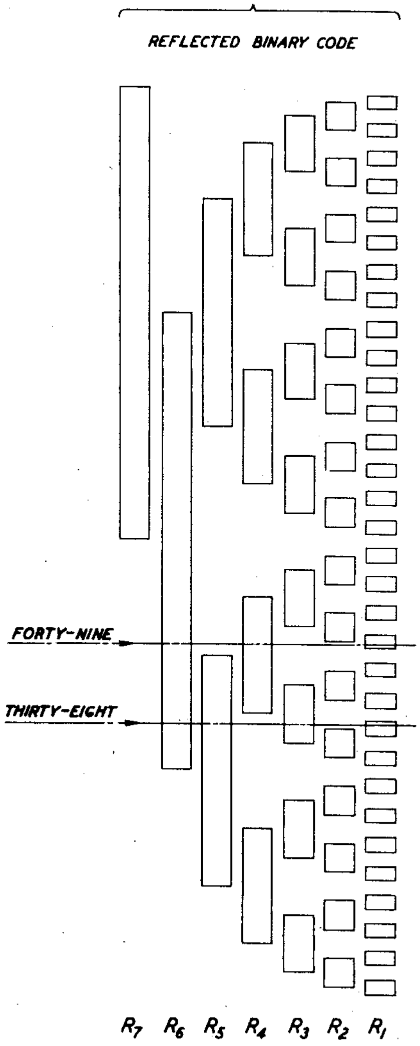

This invention relates to communication systems employing pulse code modulation and particularly to systems for translating from one type of pulse code to another.

In communication systems utilizing pulse code modulation a speech or other message wave is sampled periodically and for the purpose of transmission the resulting instantaneous amplitude is expressed by a pulse code analogous to a telegraph code.

One type of code that conveniently may be employed comprises permutations of a fixed number of code elements or digits, each of which may have any one of several values, that is, signaling conditions. An advantageous code of this type is the binary code in which each of the code elements may have either of two values. From a transmission standpoint a very satisfactory way of representing these values is to represent one value by the presence of a pulse in the pulse position or channel, that is an "on" pulse, and the other by the absence of a pulse, that is an "off" pulse. The total number of permutations obtainable with the binary code is proportional to $2^n$, where $n$ is the number of code elements used in each code character or pulse group. With such a type code $2n!$ different codes are possible for any given number of code elements $n$.

A convenient form of the binary code is that which follows the binary scale of notation and which will be termed the "conventional binary code" herein. In adapting the binary scale as a pulse code it is convenient to use "on" pulses for the 1's and "off" pulses for the 0's. The code characters of such a code in their correspondence to the binary numbers are an arithmetic representation of the amplitudes of the message wave. Similarly, each pulse position represents a certain component of the total amplitude representable by the code, an "on" pulse representing the presence and an "off" pulse the absence of that component, following the system of the scale of notation. This property of the code makes it possible to readily decode or translate the respective code characters into signals of proportionate amplitude, the significance of the code positions or elements being parallel to the denominational order of the corresponding digits of the binary number. One system for decoding that utilizes this property of the conventional binary code is that disclosed in the copending application of A. J. Rack, Serial No. 775,633, filed September 23, 1947, now Patent No. 2,514,671, granted July 11, 1950, and in an article entitled "An experimental multichannel pulse code modulation system of toll quality" in the Bell System Technical Journal for January 1948, particularly on pages 36 to 38.

Another form of binary code is described in the application of F. Gray, Serial No. 785,697, filed November 13, 1947. From the manner in which this code may be constructed, it has been termed the "reflected binary" and is referred to herein by that term. This code has certain distinct advantages particularly in the process of modulating or translating the message wave amplitudes into code characters. One property of the code from which such an advantage springs is that the code characters representing successive amplitudes differ in only one code element or digit. On the other hand, the process of decoding the code characters of the reflected binary code requires in general a circuit or apparatus of somewhat greater complexity than is required for decoding characters of the conventional binary code. This difficulty may be said to result from the fact that the elements or digits of the reflected binary code cannot be said to have the same simple significance as the code elements of the conventional binary code. They do not represent according to their character (on or off) the simple presence or absence of a corresponding component of the maximum amplitude expressable by the code. However, it is possible to translate the reflected binary code characters into the amplitudes (values) that they represent by a process of weighting the individual code elements somewhat more complicated than, though related to, the process for weighting the code elements of the conventional binary code. The copending application of Gray, previously referred to, describes this weighting process by means of mathematical formulas and also describes certain circuit arrangements for implementing it. In this process the code elements are relatively weighted and the value represented by the code character is determined by the algebraic sum of the values resulting from this weighting, the sign of the contribution of each element depending on the nature of the other elements of the particular code character. Consequently, the elements can be considered to have a relative significance that corresponds to this weighting and that is parallel to the relative significance of the code elements of the conventional binary code.

The application of Gray further sets forth a set of formulas by which the symbols of the reflected binary code are related to the symbols in the conventional binary code and by which a code character of either code can be translated into a code character of the other code. In the formulas for translations from the reflected code to the conventional code as reproduced below, the conventional code is of course treated as its analogous binary scale of notation of which $C_1$, $C_2$, $C_3 \ldots C_n$ are the digits in the order of their increasing significance. Similarly, the reflected code is treated as a scale of notation (differing in system from the familiar arithmetical scales of notation) of which $R_1$, $R_2$, $R_3 \ldots R_n$ are the digits in the order of their increasing significance, in the sense discussed in the paragraph immediately above. Since both notations like their respective codes are binary each C and each R may have only the coefficients 0 or 1. Accordingly, the formulas are, where additions are reentry additions resulting in all even sums being equal to 0 and all odd sums being equal to 1:

$$\begin{aligned}
C_n &= R_n \\
C_{n-1} &= R_n + R_{n-1} \\
C_7 &= R_n + R_{n-1} + \cdots + R_7 \\
C_6 &= R_n + R_{n-1} + \cdots + R_7 + R_6 \\
C_5 &= \ldots\ldots\ldots\ldots R_7 + R_6 + R_5 \\
C_4 &= \ldots\ldots\ldots\ldots R_7 + R_6 + R_5 + R_4 \\
C_3 &= \ldots\ldots\ldots\ldots R_7 + R_6 + R_5 + R_4 + R_3 \\
C_2 &= \ldots\ldots\ldots\ldots R_7 + R_6 + R_5 + R_4 + R_3 + R_2 \\
C_1 &= \ldots\ldots\ldots\ldots R_7 + R_6 + R_5 + R_4 + R_3 + R_2 + R_1
\end{aligned}$$

This general set of formulas may obviously be applied to a code of any given number of digits, for example 7, by noting that all higher digits $R_8 + \ldots + R_n$ are zero resulting in zero for the corresponding digits $C_8 + \ldots + C_n$.

Reentry addition as used herein is addition in finite arithmetic or addition without carry-over. In the present invention, its use is confined to the binary system of numeration and gives the following results: $0+0=0$, $0+1=1$, $1+0=1$ and $1+1=0$. Thus all even sums are expressed as 0, and all odd sums as 1, as indicated in the introduction to the preceding table of formulas. By analogy, the term may be extended to other systems of numeration thus giving in the decimal system: $0+1=1$, $1+1=2$, $2+1=3$, $\ldots$ $9+1=0$, $9+2=1$, etc. It is thus evident that in the more orthodox terms of number theory it may be defined as reduction modulo $r$, where $r$ is the radix of the system of numeration; see "Fundamental Mathematics" by Dunkin Harkin, Prentice Hall, 1941, page 57. Correspondingly, a reentry addition circuit is a circuit for performing the operation of reentry addition.

Because of the advantages of the reflected binary code in the coding operation and the advantages of the conventional binary code in the decoding operation it is often desirable to convert from one to the other and particularly to translate code characters of the reflected binary code into code characters of the conventional binary code. The application of F. Gray referred to describes certain systems for effecting this translation.

It is a general object of the invention to provide improved systems for translating reflected binary code characters into conventional binary code characters and vice versa.

In the transmission of multielement codes such as the binary code separate channels must be provided for the separate code elements. In general, this is accomplished by the use of either time division multiplex or frequency division multiplex systems. Either system alone or in combination with the other is adapted to the multiplexing of additional communication channels also employing pulse code modulation. In so far as the pulse code characters are concerned the essential operational distinction is that with time division multiplex, the code elements appear sequentially while with frequency division multiplex they appear simultaneously.

A further object of the invention is to provide a system for translating reflected binary code characters in which the code elements occur simultaneously into conventional binary code characters.

Another object of the invention is to provide a system for translating reflected binary code characters into conventional binary code characters and employing conventional vacuum tubes rather than cathode beam tubes which in general are more complicated and expensive.

In accordance with a feature of the present invention code characters of a reflected binary code are translated into conventional binary code characters by the use of a circuit comprising input circuits individual to each code element (digit) of the reflected binary code interconnected through reentry addition circuits to output circuits individual to the code elements of the desired conventional binary code. Where the code signal pulses are produced by a coder that develops the code element pulses simultaneously in individual circuits the respective input circuits may be connected directly thereto. On the other hand if the elements of the reflected binary code appear originally in a multiplex system either of the frequency or time division types, the code elements may be separated by the use of the usual filter or distribution circuits, respectively, for application to the input circuits. In particular, the reentry additions are carried out in steps beginning with the code element of the highest significance so that for code elements of lesser significance the resulting conventional binary code element is obtained by the reentry addition of the reflected code elements of the same significance to that of the next higher significance. This permits the use of more simple circuits than would be possible if the complete addition process for each code element were carried out in a single circuit. The validity of the result may be appreciated by a careful consideration of the set of formulas for translation as set forth previously. Thus it will be observed that each code element of the translated conventional code is the sum of the reentry addition of all of the reflected code elements of the same and higher significance and consequently can be substituted for the corresponding terms in the formula for the conventional code element of the next lower significance.

In accordance with another feature of this invention the reentry addition circuits comprise two pairs of cathode-coupled amplifiers with the grid of the second tube of each pair cross-connected to the cathode resistor of the other pair. With the input pulses to be added applied to the grids of the respective first tubes of each pair and the binary 1 terms being represented by negative pulses and the 0's by the absence of pulses, negative pulses again representing a binary 1 term, will be produced in the common anode circuit of the second tubes of the two pairs for unlike pulses on the two inputs (1 and 0 or 0 and 1) and no output will be produced for like pulses including the absence of both pulses (1 and 1 or 0 and 0).

Figure 1B:
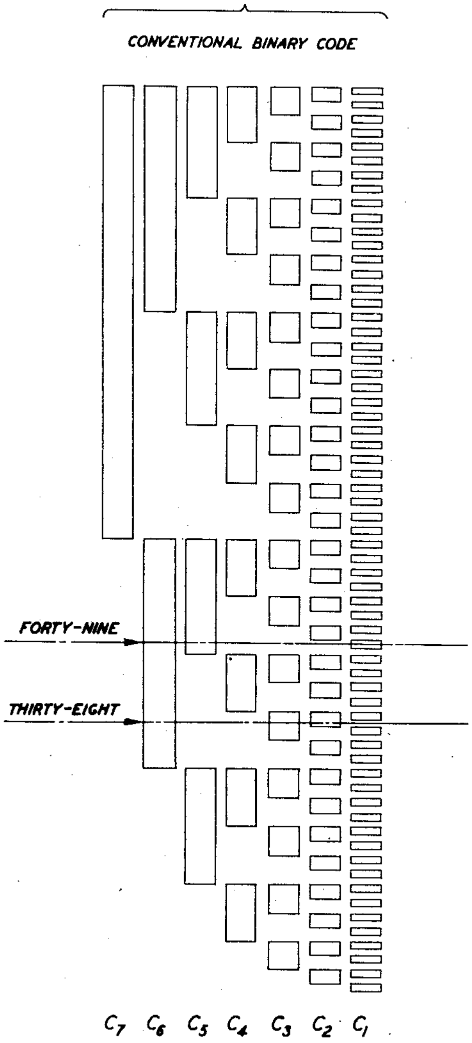
Figure 3:
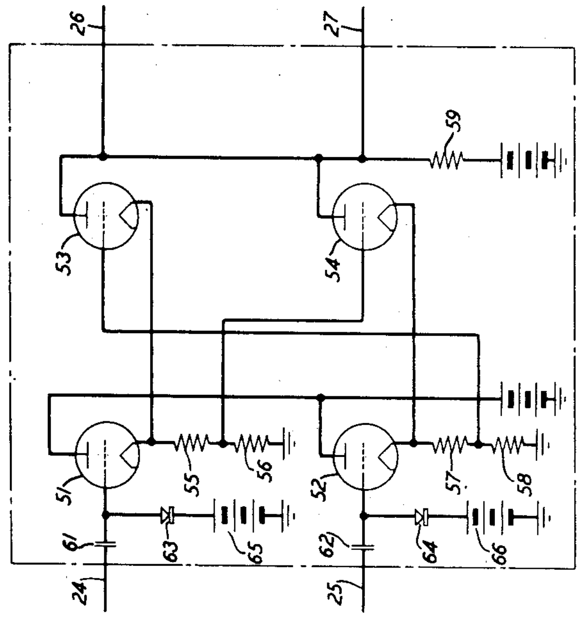
Figure 2:
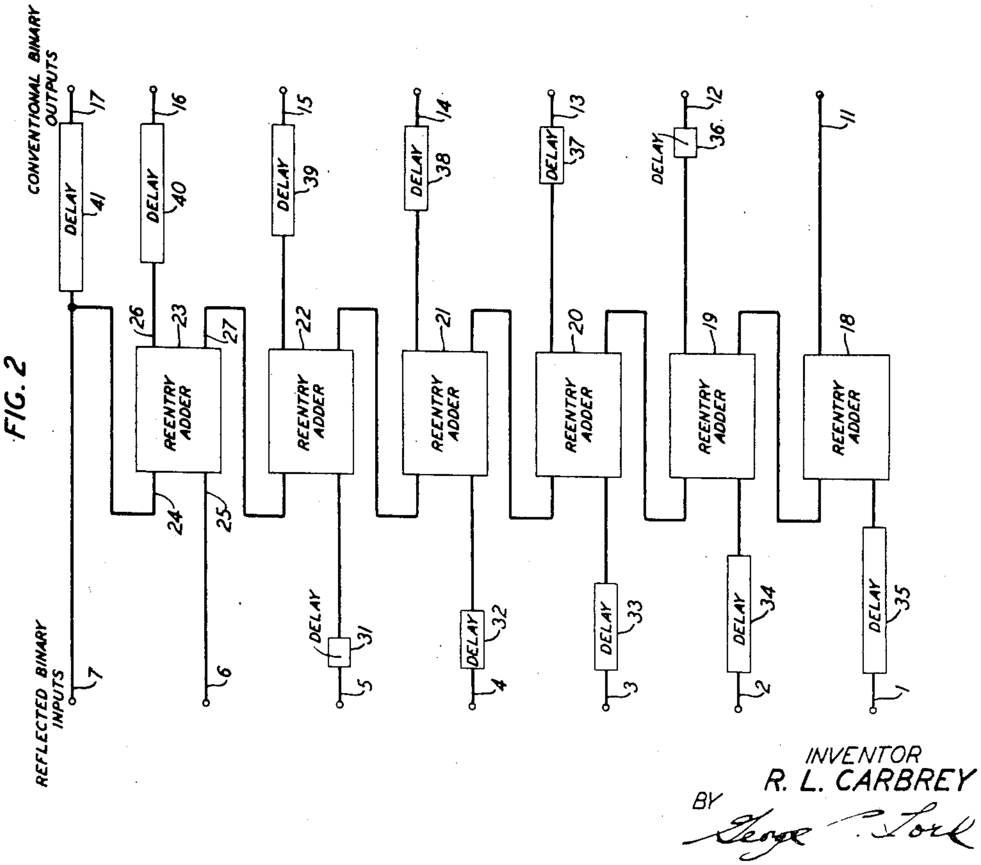
Figure 5:
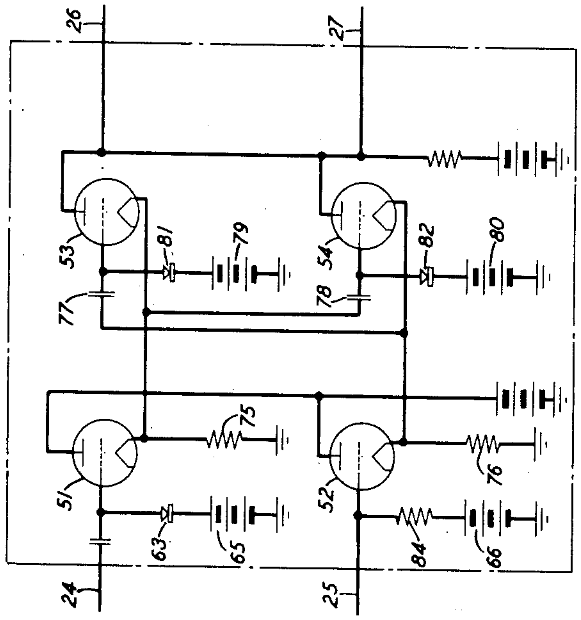
Figure 4:
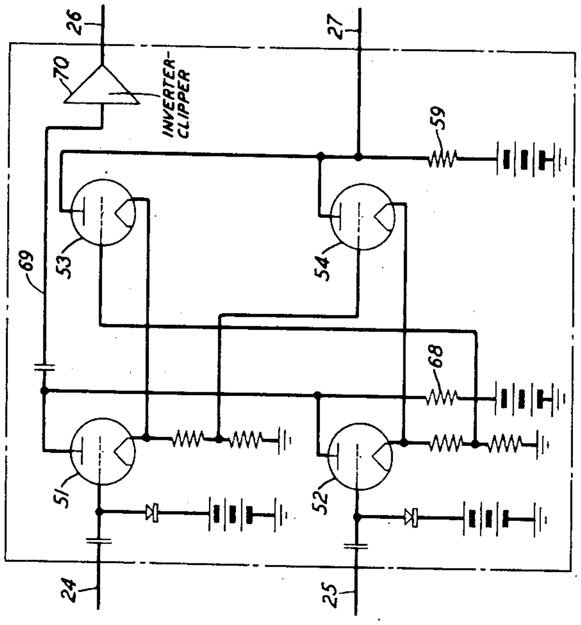

These and other objects, features and aspects of the invention may be more readily understood by reference to the following detailed description in connection with the drawing in which:

Figs. 1A and 1B are diagrams showing respectively the relative patterns of the reflected binary code and the conventional binary code as they may be observed from the coding masks for the respective codes using a coder of the type described in the article entitled "Electron Beam Reflected Tubes for Pulse Code Modulation" by R. W. Sears, Bell System Technical Journal, January 1948, pp. 44–57;

Fig. 2 is a block schematic diagram of one embodiment of the invention in a system for translating from a 7-digit reflected binary code into corresponding 7-digit conventional binary code; and Figs. 3, 4 and 5 are schematic circuit diagrams of reentry addition circuits that may be used for the "reentry adders" of Fig. 2.

Fig. 1 shows the patterns of the code characters of the reflected binary code and the conventional binary code being indicated in the convenient form used for the aperture plates of beam tube coders of the type described in the article by Mr. Sears, referred to above. The seven columns of each of the diagrams represents the seven code elements (digits) of the respective codes and are designated $R_1, R_2 \ldots R_7$ and $C_1, C_2 \ldots C_7$ respectively, as in the translation formulas set forth above. The numbering of the elements is in the order of increasing significance in the case of both the diagrams and the formulas. The quantizing levels represented by the 128 code characters available with the 7-digit codes are plotted vertically. The code character for any level may readily be found by passing a horizontal line across the diagram at the proper vertical level. For such a line passing through a rectangle the corresponding code element or digit is an "on" pulse, and for passing through a space in a code element column, it is an "off" pulse. Dash-dot lines for the equivalent decimal numbers 38 and 49 are shown.

The diagrams not only give a quick representation of the patterns of the code characteristics of the respective codes but also supplement the set of formulas previously set forth in indicating the rule of translation from the reflected code to the conventional code. The general rule for translation may be stated thus: The conventional binary code element of any significance is an "on" pulse if the total number of "on" pulses present in the sode elements of the reflected binary code of the same and higher significance is odd; and if this number is even, then the corresponding conventional binary code element is an "off" pulse. It may also be noted that the code elements of the highest significance in each code ($R_7$ and $C_7$) are always alike. Consequently, no translation is necessary for the most significant code element.

Fig. 2 is a block circuit diagram of a translator for translating a 7-element reflected binary code into a conventional binary code. There are provided seven input circuits 1 to 7 corresponding to the respective reflected binary code elements $R_1$ to $R_7$. If the reflected binary code characters are obtained from a coder in which the code elements are produced simultaneously or from the output of the respective channels of a frequency multiplex system, the code element circuits may be connected directly to the input terminals. On the other hand, if the reflected binary code characters are obtained from a time division multiplex system a distributor of one of the well-known types can be used to distribute them to the individual input terminals. (If the distributor is of the delay line type, the delay networks utilized in the translator and to be later described may be combined in the distributor.)

It will be appreciated that the pulses applied to the inputs 1 to 7 will have been subjected to the proper shaping or regenerating process particularly where the translator is used at the receiving end of a system.

The resulting conventional binary code elements will appear on the output circuits 11 to 17 that are interconnected with the input terminals 1 to 7 through the reentry adders 18 to 23. Delay networks are also connected between certain of the input and output terminals and the reentry adders as will be later described. As was indicated in connection with the discussion of Fig. 1 and the set of translation formulas, the conventional binary code element of highest significance is always the same as the corresponding reflected binary code element. Consequently, the input terminal 7 is connected directly to the output terminal 17.

The reentry adders 18 to 23 are identical. For example, circuit 23 is provided with two input terminals 24 and 25 and two output terminals 26 and 27. In the preferred form of the reentry adder as shown in Fig. 3, the two output terminals 26 and 27 are identical. This is also the case for the modification shown in Fig. 5. However, in the modification in Fig. 4, the output terminals are separate and consequently are so shown in Fig. 1. In all cases identical pulses are produced in the two outputs.

As will be explained in more detail in a later description of the schematic circuits of Figs. 3 to 5, each reentry adder operates to produce a pulse in the two outputs 26 and 27 in response to pulses of different character on the two inputs 24 and 25 and to produce no pulse in the outputs 26 and 27 in response to inputs of the same character in inputs 24 and 25. For the particular type of reentry adders shown in Figs. 3 to 5, negative pulses on the inputs 1 to 7 are assumed for "on" pulses representing the binary 1 digits and the absence of pulses, that is, "off" pulses represent the binary 0 digits. Correspondingly, negative pulses are produced in the outputs 26 and 27 to represent the binary 1 digits and "off" pulses to represent the binary 0 digits. Consequently, the reentry adders operate to produce negative "on" pulses (1 digits) in response to odd inputs and "off" pulses (0 digits) in response to even inputs.

Ideally, the circuit would operate to produce conventional binary code elements in the outputs 11 to 17 simultaneously with the appearance of the reflected binary code elements in the inputs 1 to 7. Actually, the reentry adders 18 to 23 require a finite time for operation so that there is a slight delay in each. Generally, provision must be made to compensate for this delay, particularly, as the delays of the individual adders are cumulative in the circuits for the code elements of lower significance. In tests of representative circuits it has been found that the delay in each adder is about 0.01 microsecond. With a delay of that order the effect is negligible for pulses of 0.5 microsecond or more in duration and codes of the order of seven digits. For pulses of shorter duration it is desirable and often necessary to compensate for the delay in the operation of the circuits.

This compensation may be achieved by staggering the time of application of the pulses to the various adders and by providing an inverse stagger in the outputs to bring the output pulses into coincidence. Such a staggering can be provided by the use of delay networks of known types, for example, an appropriate length of coaxial cable or a delay network of lump constants. Assuming the .01 microsecond delay for each reentry adder, a delay line 31 inserted between the input terminal 5 and the reentry adder 22 and having a transmission time of .01 microsecond will bring the two inputs to the reentry adder 22 into coincidence. A line 32 of .02 microsecond delay, a line 33 of .03 microsecond delay, a line 34 of .04 microsecond delay and a line 35 of .05 microsecond delay connected to the inputs 4, 3, 2 and 1, respectively will similarly produce coincidence between the inputs to the respective adders 20, 21, 19 and 18. In order to compensate for the effect of these delay networks and the delay in adder 18 in bringing the output code elements in the circuits 11 to 17 into coincidence, delay networks 36, 37, 38, 39, 40 and 41 providing respective delays of .01, .02, .03, .04, .05 and .06 microsecond are required in the respective leads 12 to 17.

The constants of the delay networks just described are determined solely by the delay in the adders and are entirely independent of the duration of the pulses so that the circuit as just described will function for pulses of any length. If it were desired to make the translation operation sequential in the sense that one code element is terminated before the translation of the next in order of decreasing significance, the constants of the delay networks would have to be adjusted to both the time of operation of the adder circuits and to the duration of the pulses.

As previously suggested, if the reflected binary code pulses to be applied to the input circuits 1 to 7 are obtained from a time division multiplex system in which they appear serially and a distributor of the delay line type is employed for distributing them to the circuits 1 to 7, the delay lines 31 to 35 may be combined in the distributing circuit. Similarly, if it is desired to transmit the output pulse from the terminals 11 to 17 by time division multiplex, the delay lines 36 to 41 may be combined in a delay line distributor for this purpose.

Fig. 3 is a schematic circuit diagram of a preferred form of the reentry adder. The input terminals 24 and 25 and the output terminals 26 and 27 have been numbered like the corresponding terminals of the reentry adder 23.

The circuit employs two input triodes 51 and 52 and two output triodes 53 and 54. (If desired the two tubes 51 and 52 may be the two halves of a twin tube and similarly with respect to triodes 53 and 54.) Tubes 51 and 53 are coupled through a common cathode resistor which comprises the series connected resistors 55 and 56. Similarly, tubes 52 and 54 are coupled through the common cathode resistor comprising the resistors 57 and 58. The tubes 53 and 54 are provided with a common plate resistor 59 and are coupled to the parallel connected output terminals 26 and 27.

The input terminals 24 and 25 are connected to the grids of the tubes 51 and 52 through the respective blocking capacitors 61 and 62. The grids of these tubes are also connected through the germanium varistors 63 and 64 and grid biasing batteries 65 and 66 to ground. The varistors 63 and 64 act as direct-current restorers and are required because there may be a considerable variation in duty factor in the pulsed inputs. The varistor 64 and coupling capacitor 62 may be omitted depending upon the type of pulse shaper or regenerative circuit used in the code element input circuits preceding the translators.

As previously indicated it is assumed that the circuit is operated with negative pulses for "on" pulses. Accordingly, the tubes 51 and 52 have their grids biased positive so that they are conducting in the absence of input pulses and operate as cathode followers. The two resistors making up the cathode resistor of each of these tubes are so proportioned that the larger part of the voltage drop occurs across the grounded resistor, that is, resistor 56 and resistor 58 have high resistances compared to resistors 55 and 57, respectively. For example, assuming the use of Western Electric Company 396A vacuum tubes, a plate voltage of 300 volts and a grid biasing voltage of +150 volts under the normal rest condition with no signal applied to the grids, the cathode voltage can be taken as about 151 volts and the voltage at the junction of the cathode resistors as 145 volts. Under these conditions, the tubes 53 and 54 will not conduct since their cathodes are at the same voltage as the cathodes of the tubes 51 and 52 and their grids are at the voltage at the junction of the cathode resistors which is about 6 volts below that of the cathodes and below the cut-off voltage.

The operation of the circuit under the four possible input conditions will now be considered, assuming that the input marking or "on" pulse is a pulse of about 12 volts negative:

First, with an "off" or spacing pulse in the inputs to both tubes 51 and 52 the condition will be the same as that just described for a normal rest condition. Accordingly, there is no output from the tubes 53 and 54 which are cut off and a spacing condition or "off" pulse appears at the terminals 26 and 27.

Second, with "on" pulses about 12 volts negative applied to the grids of both tubes 51 and 52. In this situation the cathodes of the tubes 51 and 52 will change from the rest condition by about the same amount as the grids, dropping by about 12 volts to a voltage of 139 volts in accordance with the cathode follower action. The cathodes of tubes 53 and 54 will, of course, be carried to the same voltage. However, tubes 53 and 54 will remain cut off since the change in their grid voltages will be almost as large as that in their cathode voltages. The reason for this is that, as stated in the considerations of the rest condition, the voltage drop across each of the resistors 55 and 57 is small compared to that across the respective resistors 56 and 58. From another viewpoint, since there is a change of only 12 volts in the 150-volt drop across each complete cathode resistor there will be only a proportional change in the 6-volt drop across the grid biasing resistor (55 or 57) and the corresponding biasing voltage on the grids of tubes 53 and 54 will still be sufficient to maintain the tubes cut off. For this second condition, there will also be no output produced across the resistor 59 and consequently an "off" pulse condition in the outputs 26 and 27.

Third, with an "off" pulse on tube 51 and an "on" pulse on tube 52. Under such conditions, tube 51 will remain in the rest condition and maintain the grid of tube 54 at 145 volts. The negative 12-volt "on" pulse applied to the grid of tube 52 causes a reduction of space current in that tube and in the absence of interaction with other tubes its cathode would fall a similar amount to 139 volts. However, the cathode of tube 54 is carried along at the same voltage as cathode 52 and since the grid of tube 54 is maintained at 145 volts by tube 51, it will conduct as soon as the cathode voltage is reduced to a value such that the resulting grid-cathode voltage is less than the cut-off value. As a result, tube 54 acts as a cathode follower establishing its cathode voltage at about 146 volts. In this operation the cathode current is transferred to tube 54 from tube 52 which becomes cut-off, its grid voltage being pulsed to 138 volts which is more than the 6-volt cut-off value below the cathode voltage of 146 volts established by the action of tube 54. The plate current thus transferred to tube 54 flows through the plate resistor 59 producing at the output terminals 26 and 27 a negative "on" pulse.

The fourth case is for an "on" pulse on the grid of tube 51 and an "off" pulse on the grid of tube 52. The action in this case is the same as that just described except that the current transfer takes place between the tubes 51 and 53 instead of between the tubes 52 and 54. A negative "on" pulse is produced at the output terminals 26 and 27 by the space current of tube 53 flowing through the resistor 59.

Fig. 4 shows a variation of the circuit of Fig. 3 in which the essential difference is that the code element output for the common binary code is separated from the coupling to the reentry adder of the subsequent code element stage. This arrangement has the advantage of isolating any small reflections due to mistermination of the output delay line so as to prevent their interference in the operation of the reentry adders of subsequent code element stages. The circuit of Fig. 4 is generally similar to that of Fig. 3 and corresponding circuit elements are given the same reference numerals. The essential difference is that the tubes 51 and 52 are provided with a common plate resistor 68.

The operation of the tubes and the output from the load resistor 59 of the tubes 53 and 54 to the output terminal 27 is the same for all conditions of input as that of the circuit of Fig. 3. Consequently, only the output conditions at the terminal 26 will be discussed.

When a negative "on" pulse is applied to one of the tubes 51 or 52 but not to the other the current through the common plate resistor 68 will be halved, producing a full voltage positive pulse in the lead 69. This pulse is inverted in the inverter-clipper 70 to produce a negative "on" pulse at the output terminal 26.

When negative "on" pulses are applied to the grids of both tubes 51 and 52 the current through the anode resistor 68 will be reduced by only a small amount (about 16 per cent) which will produce on the lead 69 a small positive pulse that is of insufficient amplitude to be transmitted through the inverter-clipper 70 causing the required "off" pulse condition at the terminal 26.

Fig. 5 shows another variation of the reentry adder circuit of Fig. 3. Again, similar circuit elements have been given the same reference numerals. The fundamental difference in this circuit from that of Fig. 3 is that the cathode resistors of the tubes 51 and 52 are not tapped. Instead, the single resistors 75 and 76 are employed and the grids of the tubes 53 and 54 are connected to the cathodes of the tubes 52 and 51 respectively through the blocking capacitors 77 and 78. This type of circuits requires separate biasing voltages for the grids of the tubes 53 and 54. These are provided by the respective batteries 79 and 80 connected to the grids of the tubes 53 and 54 through the varistors 81 and 82 operating as direct-current restorers. The batteries 79 and 80 maintain the grid voltages of the tubes 53 and 54 about 6 volts below the normal cathode potentials of the tubes in the absence of pulses.

In the circuit of Fig. 5 no direct-current restorer is used in the grid circuit of tube 52, load resistor 84 being provided in its place which is directly coupled to the preceding circuit. With this circuit battery 66 not only supplies the plate current of the preceding stage but also the grid bias voltage required for tube 52. This is for the condition discussed with respect to Fig. 3 when the nature of the circuits preceding the input terminals 1 to 7 makes unnecessary the use of a direct-current restorer.

While the circuits of Figs. 3 to 5 have been shown and described with the use of conventional vacuum tube triodes, these types of circuits are well adapted for the use of solid element amplifiers which have come to be known as "transistors," for example as disclosed in the copending application of J. Bardeen and W. H. Brattain, Serial No. 33,466, filed June 17, 1948, now Patent No. 2,524,035. Such amplifiers are considered to be the full equivalents of the triode vacuum tubes in so far as the operation of the present circuits and the language of the appended claims is concerned. Other modifications may also occur to those skilled in the art without departing from the spirit or scope of the invention. For example, types of reentry addition circuits other than those shown herein may be used in the translator and the reentry addition circuits shown herein may be found useful in other types of translators or computers.

What is claimed is:

1. A system for translating reflected binary pulse code characters into code characters of the conventional binary pulse code comprising a plurality of input circuits one for each code element of the reflected binary code, a plurality of output circuits one for each element of the conventional binary code, a plurality of reentry addition circuits each comprising a first pair of electron tubes, each having an anode, a cathode and a control electrode, a first resistor connected in the cathode circuits of both tubes of said first pair, a second pair of electron tubes each having an anode, a cathode and a control electrode, a second resistor connected in the cathode circuits of both tubes of said second pair, connections from the control electrode of a first tube of said first pair to said second resistor, connections from the control electrode of the first tube of said second pair to said first resistor and means for biasing the control electrodes of the other tubes of said first and said second pairs to conduct in the absence of input pulses, a connection from the control electrode of said other tube of one of said pairs of each reentry addition circuit to one of said input circuits, a connection from the control electrode of said other tube of the other of said pairs to that one of said output circuits corresponding to the code element of significance next highest to that of the code element of the input circuit connected to said other tube of one of said pairs, and a connection from the anodes of said first tubes of said first and second pairs to that output corresponding to the code element of the same significance as that of the input circuit connected to said other tube of one of said pairs.

2. In combination a first pair of electron tubes, each having an anode, a cathode and a control electrode, a first resistor connected in the cathode circuits of both tubes of said first pair, a second pair of electron tubes each having an anode, a cathode and a control electrode, a second resistor connected in the cathode circuits of both tubes of said second pair, a connection from the control electrode of a first tube of said first pair to said second resistor, a connection from a control electrode of a first tube of said second pair to said first resistor, means for biasing the control electrodes of the other tubes of said first and second pairs to conduct in the absence of inputs thereto producing in said first and second resistors voltages blocking the flow of space current in said first tubes of said first and second pairs, a source of negative input pulses connected to the control electrodes of each of said other tubes of said first and second pairs, and an output circuit connected in parallel to the anodes of said first tubes of said first and second pairs.

3. In combination a pair of electron tubes having a cathode, an anode and a control electrode, an anode circuit impedance circuit element connected to both of said tubes, a first and a second input electronic tube each having a cathode, an anode and a control electrode, a cathode resistor network for each of said input tubes and each comprising two series connected resistors, one connected to the cathode and having a resistance low compared to the other, a connection from the cathode of said first input tube to the cathode of one of said pair of tubes, a connection from the cathode of said second input tube to the cathode of the other of said pair of tubes, a connection from the junction of the resistors in the cathode resistor network of the first input tube to the control electrode of said other of said pair of tubes, a connection from the junction of the resistors in the cathode resistor network of said second input tube to the control electrode of said one of said pair of tubes, means for supplying negative input pulses to be added to the grids of said input tubes, means for so biasing said input tubes that each is conducting in the absence of such input pulses to its control electrode producing across the resistor connected to its cathode a voltage drop sufficient to block the flow of anode cathode current in the respective one of said pair of tubes having its grid connected to said resistor, and an output circuit connected to the anodes of both tubes of said pair.

4. A system for translating reflected binary code characters into code characters of the conventional binary code comprising; a plurality of first circuits each carrying a signal representing one digit of a reflected binary code character; a plurality of output circuits one for each digit of the conventional binary code character corresponding to the reflected binary code character represented by the signals on said first circuits; a plurality of reentry addition circuits each having two input terminals and an output terminal, and each adapted to respond to binary signals of like characteristic on said two input terminals to produce a binary signal of one characteristic on said output terminal and to respond to binary signals of unlike characteristic on said two input terminals to produce a binary signal of the characteristic opposite to said one characteristic on said output terminal; a connection from that one of said first circuits carrying a signal representing the digit of highest significance of the reflected binary code character directly to that one of said output circuits corresponding to the digit of highest significance of the conventional binary code character; connections from one input terminal of each reentry circuit to a respective one of the others of said first circuits carrying a signal representing one digit of a binary code character; connections from the other input terminal of each of said reentry circuits to the output circuit for that digit of the conventional code of significance higher than the significance of the reflected binary code digit represented by the signal carried by the first circuit connected to said one input terminal of the respective reentry addition circuit; and connections from the output terminal of each reentry addition circuit to that one of said output circuits corresponding to the digit of the conventional binary code character of significance corresponding to the significance of the reflected binary code digit represented by the signal carried by the first circuit connected to said one input terminal of the respective reentry addition circuit.

ROBERT L. CARBREY.

REFERENCES CITED

The following references are of record in the file of this patent:

UNITED STATES PATENTS

| Number | Name | Date |
|---|---|---|
| 1,470,594 | Branson | Oct. 16, 1923 |
| 2,429,228 | Herbst | Oct. 21, 1947 |
| 2,454,781 | Deakin | Nov. 30, 1948 |